(12) United States Patent
Kilcher et al.

(10) Patent No.: US 8,998,424 B2
(45) Date of Patent: Apr. 7, 2015

(54) MICRO-PROJECTION DEVICE WITH ANTI-SPECKLE IMAGING MODE

(75) Inventors: Lucio Kilcher, Montreux (CH); Faouzi Khechana, Preverenges (CH); Nicolas Abele, Lausanne (CH)

(73) Assignee: Lemoptix SA, Lausanne (CH)

( * ) Notice: Subject to any disclaimer, the term of this patent is extended or adjusted under 35 U.S.C. 154(b) by 89 days.

(21) Appl. No.: 13/638,279

(22) PCT Filed: Apr. 28, 2010

(86) PCT No.: PCT/EP2010/055763
§ 371 (c)(1),
(2), (4) Date: May 23, 2013

(87) PCT Pub. No.: WO2011/134515
PCT Pub. Date: Nov. 3, 2011

(65) Prior Publication Data
US 2013/0235354 A1 Sep. 12, 2013

(51) Int. Cl.
*G03B 21/14* (2006.01)
*G02B 27/48* (2006.01)
*G02B 26/08* (2006.01)
*G02B 26/10* (2006.01)
*H04N 9/31* (2006.01)
*G03B 21/16* (2006.01)

(52) U.S. Cl.
CPC ............ *G02B 27/48* (2013.01); *G02B 26/0833* (2013.01); *G02B 26/101* (2013.01); *H04N 9/3129* (2013.01); *G03B 21/16* (2013.01)

(58) Field of Classification Search
USPC ................. 359/290, 291, 315, 316, 247, 267, 359/198.1; 353/31, 46, 50, 51
See application file for complete search history.

(56) References Cited

U.S. PATENT DOCUMENTS

| | | | | |
|---|---|---|---|---|
| 6,557,429 B1 * | 5/2003 | Asquith | ........................... | 73/865 |
| 7,401,927 B2 * | 7/2008 | Hibi et al. | ....................... | 353/37 |
| 8,593,613 B2 * | 11/2013 | Chen | .............................. | 349/187 |
| 2006/0268241 A1 * | 11/2006 | Watson et al. | .................. | 353/94 |
| 2007/0211001 A1 * | 9/2007 | Duncan | .......................... | 345/84 |
| 2007/0296645 A1 * | 12/2007 | Lee et al. | .......................... | 345/6 |
| 2008/0170285 A1 * | 7/2008 | Kasazumi et al. | ............ | 359/223 |
| 2008/0291951 A1 * | 11/2008 | Konttinen et al. | .............. | 372/21 |
| 2009/0115917 A1 | 5/2009 | Horikawa | | |
| 2009/0141193 A1 * | 6/2009 | Nakayama et al. | ........... | 348/751 |

(Continued)

FOREIGN PATENT DOCUMENTS

JP  S5068347  6/1975
JP  H06208089 A  7/1994

(Continued)

*Primary Examiner* — William C Dowling
(74) *Attorney, Agent, or Firm* — Tarolli, Sundheim, Covell & Tummino LLP

(57) ABSTRACT

A micro-projection system for projecting light on a projection surface (104), comprising: —at least one coherent light source (101); —optical elements (102, 108, 109) in the optical path between said coherent light source and said projection surface; —said optical elements including at least one reflective member (102) actuated by a drive signal for deviating light from said light source so as to scan a projected image onto said projecting surface; —said optical elements including at least one pixel displacement unit (106) for providing a displacement signal synchronized with the image scanning signal so as to reduce speckle onto said projecting surface. The corresponding method for reducing speckle is also provided.

15 Claims, 6 Drawing Sheets

(56) References Cited

U.S. PATENT DOCUMENTS

| | | | |
|---|---|---|---|
| 2009/0244669 A1* | 10/2009 | Uchikawa | 359/202.1 |
| 2010/0066770 A1 | 3/2010 | Fredlund | |
| 2010/0165307 A1* | 7/2010 | Mizushima et al. | 353/98 |
| 2010/0245773 A1* | 9/2010 | Arita | 353/31 |
| 2010/0277702 A1* | 11/2010 | Gollier | 353/81 |
| 2010/0315597 A1* | 12/2010 | Powell et al. | 353/20 |
| 2012/0206782 A1* | 8/2012 | Chan et al. | 359/199.2 |
| 2014/0002804 A1* | 1/2014 | Tsai et al. | 353/98 |

FOREIGN PATENT DOCUMENTS

| | | |
|---|---|---|
| JP | 2003255252 A | 9/2003 |
| JP | 2005292380 A | 10/2005 |
| JP | 2007510954 A | 4/2007 |
| JP | 2009122660 A | 6/2009 |
| JP | 2009223165 A | 10/2009 |
| JP | 2009251004 A | 10/2009 |
| WO | 2005078519 A1 | 8/2005 |
| WO | 2007032216 A1 | 3/2007 |
| WO | 2007104016 A2 | 9/2007 |

\* cited by examiner

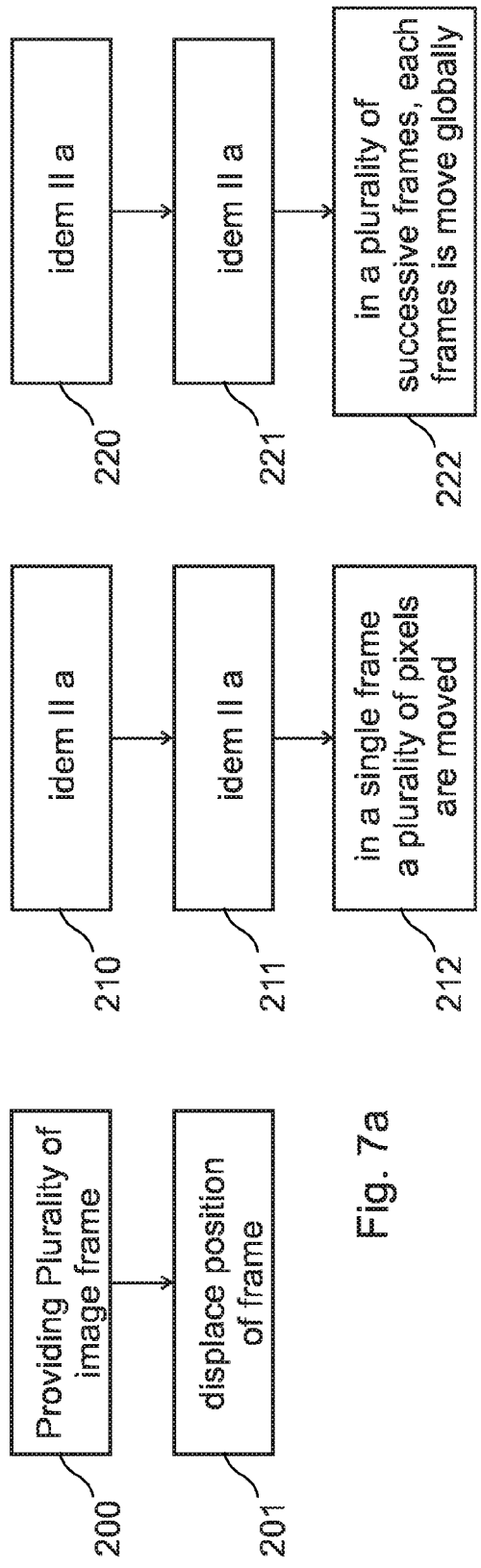

MICRO-PROJECTION DEVICE WITH ANTI-SPECKLE IMAGING MODE

This application is a National Phase Filing of PCT/EP2010/055763, filed Apr. 28, 2010, the subject matter of which is incorporated herein by reference in its entirety.

FIELD OF THE INVENTION

The present invention relates to a micro-projection system comprising at least one coherent light source, such as laser, and optical elements in optical path between the light source and a projection surface. It also relates to a method for reducing speckle in a laser micro-projection system.

BACKGROUND OF THE INVENTION

Speckle is a phenomenon created with laser light sources, due to the fact that laser light is coherent. Parallels and synchronized wavefronts simultaneously hit the projection surface. When the light hits the surface, it creates constructive and destructive interference. The first category of interference induces an image deterioration that is often visible by human eye and/or by sensors. In addition to a loss of image quality, visual comfort of the viewer may also be affected.

Several techniques are used in order to remove or reduce speckle. In many cases, light coherence reduction techniques are used. For instance, the light hitting the projection surface is provided from various projection angles. Polarized laser light hitting a depolarized film is also used. Otherwise, illumination using various laser wavelengths may also be used.

Another approach consists in using vibration of the projection surface. The resulting systems are complex, expensive, and involve very specific hardware material.

WO2009/077198 describes an optical system comprising a coherent light source and optical elements for directing light from the source to a target. The optical elements include at least one diffusing element arranged to reduce a coherence volume of light from the source and a variable optical property element. A control system controls the variable optical property element such that different speckle patterns are formed over time at the target with a temporal frequency greater than a temporal resolution of an illumination sensor or an eye of an observer so that speckle contrast ratio in the observed illumination is reduced. The variable optical property element may be a deformable mirror with a vibrating thin plate or film. This solution requires modifying the projection system in order to integrate additional components, such as diffusing elements.

WO2007/112259 describes a system and method for reducing or eliminating speckle when using a coherent light source. A refracting device, comprising a birefringent material, is positioned such that the refracting device intercepts the coherent light. The refracting device rotates, thereby causing the ordinary and/or extraordinary beams to move. The human eye integrates the movement of the beams, reducing or eliminating laser speckle. The refracting device may include one or more optical devices formed of a birefringent material. Wave plates, such as a one-half wave plate, may be inserted between optical devices to cause specific patterns to be generated. Multiple optical devices having a different orientation of the horizontal component of the optical axis may also be used to generate other patterns. Furthermore, the refracting device may include an optical device having multiple sections of differing horizontal components of the optical axis. This solution involves a complex and expensive component, the rotating refracting device. Moreover, the integration of such device requires a specific global design.

US2009/0161196 describes a system and method for temporally varying the interference pattern generated by a coherent light source to homogenize the speckle pattern so that the speckle phenomenon is less observable. In accordance with an exemplary embodiment, an oscillating refractive element may be disposed within an optical system to create a temporally variable phase shift in the lights rays emanating from a coherent light source to eliminate static interference patterns on a light receiving element, reducing the speckle phenomenon. This solution involves a complex and expensive component, the oscillating refractive element. Moreover, the integration of such device requires a specific design of the projection system.

JP2001296503 describes a device for reducing speckle, which can decrease the speckle pattern appearing on the illumination face to produce uniform illumination. The laser light with linearly polarized light having the polarization plane rotated by 45 degrees is made incident on a first polarization beam splitter to be separated into the P polarized light component and S polarized light component. The P polarized light component is transmitted while the S polarized light component is reflected to equally separate the both polarized light components. The P polarized light component directly propagates while the S polarized light component is reflected by a return prism to produce an optical path difference longer than the coherence length from the optical path length of the P polarized light. Thus, incoherent laser light having two kinds of polarized light components with the optical path difference longer than the coherence length is obtained as the output from the second polarization beam splitter. This arrangement involves a complex and expensive optical system.

US2009046361 describes a reflection type screen capable of suppressing effect of external light and obtaining a wide angle of view and a forward projection system having a reflection type screen. The reflection type screen includes a transparent prism arranged in parallel to the longitudinal direction of a base. The transparent prism has a transparent plane and a diffusion-reflection plane formed by arranging a reflection film on one of the surfaces of the transparent prism. Projected light is diffused/reflected by the diffusion-reflection plane. The diffusion-reflection plane may be vibrated in order to decrease speckle noise by laser light beams. For example, by vibrating the reflection type screen in up and down, right and left, or back and fourth direction, the diffusion-reflection plane may be vibrated. Otherwise, by varying the interval W between the base and the front sheet by an air pump, the diffusion-reflection plane may also be vibrated. This arrangement involves a particular construction with a forward projection system having a complex screen configuration.

Thus, there is a need for a novel micro-projection system with reduced speckle having MEMS micro-mirrors and MEMS components in general, that do not present the above mentioned drawbacks, namely the complexity and costs problems caused by using specific configurations with additional components used only for speckle reduction.

SUMMARY OF THE INVENTION

A general aim of the invention is therefore to provide an improved method and device for reducing or suppressing speckle in a laser micro-projection system.

A further aim of the invention is to provide such method and device for reducing or suppressing speckle, which offers more possibilities for integration with pre-existing laser micro-projection systems without requiring important modifications.

Still another aim of the invention is to provide such method and device for reducing or suppressing speckle, providing efficient performances at reasonable cost.

Yet another aim of the invention is to provide such method and device for reducing or suppressing speckle, using components that can be fully integrated into a laser micro-projection device.

These aims are achieved thanks to the method for reducing speckle and the micro-projection system defined in the claims.

There is accordingly provided a micro-projection system for projecting light on a projection surface, comprising:

at least one coherent light source;

optical elements in the optical path between said coherent light source and said projection surface;

said optical elements including at least one reflective member actuated by a drive signal for deviating light from said light source so as to scan a projected image onto said projecting surface;

said optical elements including at least one pixel displacement unit for providing a displacement signal synchronized with the image scanning signal so as to reduce speckle onto said projecting surface.

The synchronization is either with the horizontal or vertical image scanning. For instance, in order to displace a scan line or column, a very small offset value is provided, thereby causing a different deflection angle in the horizontal or vertical direction.

The pixel displacement unit is advantageously adapted to provide a displacement of at least a portion of a first image with respect to the same or another image frame in order to reduce speckle.

In a first embodiment, the pixel displacement unit provides a signal superposed to the reflective member drive signal. The displacement signal provided by the pixel displacement unit is most preferably synchronized with the image scanning signal provided by the scanning mirror drive unit.

In another embodiment, the pixel displacement unit provides the required displacement by mechanical action with an optical element, such as a reflective member.

In an advantageous embodiment, the reflective member is a MEMS type scanning mirror and the pixel displacement unit is connected to said scanning mirror. In a variant, the pixel displacement unit comprises a MEMS mirror heating and cooling system.

In another variant, the pixel displacement unit is connected to an additional optical element provided in the optical path, such as for instance, a mirror or a reflective membrane.

The pixel displacement unit may comprise a vibration generator adapted to provide said displacement. In advantageous variants, the pixel displacement unit may comprises a magnetic, thermal, piezo-electric, or electrostatic generation unit.

In another variant, the pixel displacement unit comprises a rotating micro-motor having a substantially rough surface.

The invention also provides a method for reducing speckle in a laser micro-projection system, comprising:

providing a plurality of successive image frames with at least one coherent light source towards a target;

providing a displacement of at least a portion of a first image frame with respect to the same or another image frame so as to reduce speckle onto said projecting surface.

The method preferably generates a displacement of a plurality of pixels or lines or frames with respect to another pixel, line or frame.

In an embodiment involving the pixels of a single frame, a plurality of pixels are moved with respect to the others. In a variant, the pixels are moved individually one with respect to the others. Such displacement pixel by pixel provides excellent results to compensate speckle, as there is more random movement from one pixel to another.

In another variant, the pixels of one line are moved with respect to another line or the pixels of one column are moved with respect to another column.

In a further embodiment, involving the pixels of a plurality of successive frames, at least some entire frames are moved with respect to others. This embodiment is particularly simple to implement.

The pixel displacement is provided by a pixel displacement unit either connected to an optical element of the micro-projection system or electronically cooperating with a scanning mirror drive unit for sending a displacement signal synchronized with the image scanning signal so as to reduce speckle onto said projecting surface.

The pixel displacement is advantageously at least 0, 1 (10%) of the pixel size.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIGS. 7a, 7B and 7c illustrates the main steps of the method for reducing speckle in a micro-projection device;

DETAILED DESCRIPTION OF THE INVENTION

For clarity, as is generally the case in representation of micro-systems, the various figures are not drawn to scale.

Figure 1A:
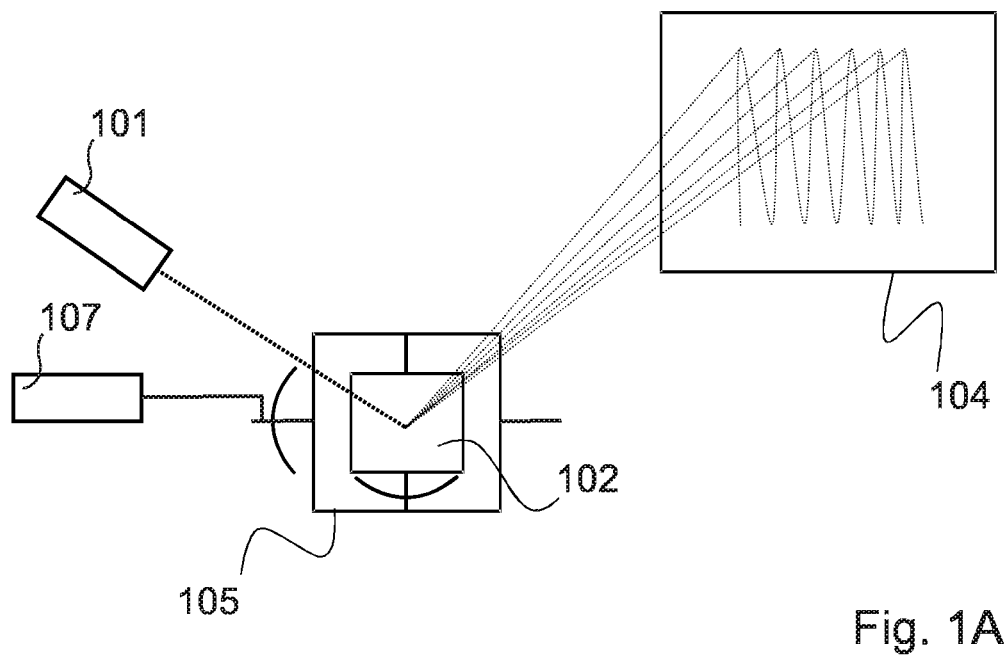
FIGS. 1A and 1B illustrate examples of MEMS micro-mirror-based projectors using respectively a single mirror moving along two perpendicular axes, or two Degrees Of Freedom (2 DOF), and a projector using two MEMS micro-mirrors moving along one axis (1 DOF)
Figure 1B:
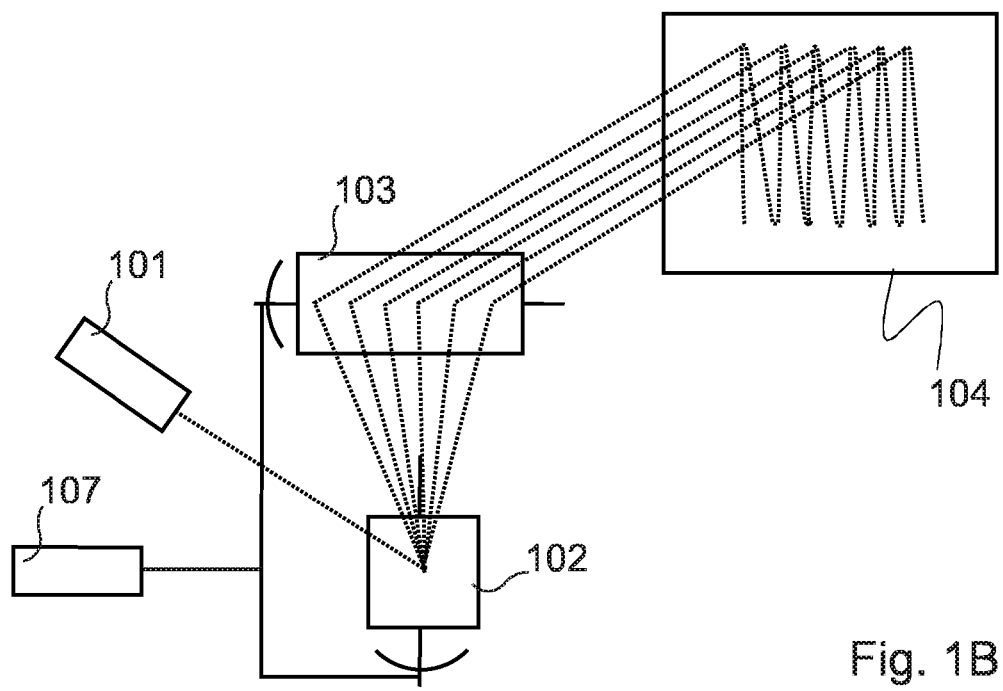

Micro-Electro-Mechanical-Systems (MEMS) in terms of scanning or moving micro-mirrors are currently being used for projection purposes. The projection can either be done using a single mirror moving along two central and perpendicular axis (two degrees of freedom 2DOF) as shown in FIG. 1A, or two mirrors moving along a central axis (one degree of freedom 1 DOF) both placed at 90 degrees one to each other as shown in FIG. 1B. In FIG. 1A, the image is created by centering a collimated laser beam produced by laser 101 in the middle of the 2DOF micro-mirror surface 102 within the frame 105. The laser beam is reflected and deviated in two directions, so as to project a scanned image on the projection surface 104.

In FIG. 1B, the projected image is created by centering a collimated laser beam on the first 1DOF micro-mirror surface 102. The laser is reflected to a second 1DOF micro-mirror surface 103 with the rotation axis placed at 90 degrees compared to the first 1 DOF micro-mirror. During the actuation of the mirror(s), the collimated laser beam can be pulsed at a specific frequency to create an image with bright, dark and grayscale parts. A monochromatic image is projected when a monochromatic laser source is used. A multi color image can be projected when multiple different monochromatic laser sources are used simultaneously. In the latter case, a known type beam combiner is preferably used.

A drive signal is used to operate the scanning mirrors 102, 103 in an optimized way. This drive signal is provided by the scanning mirror drive unit 107.

Depending on the embodiment, a pixel displacement unit 106 generates a displacement of a pixel, or a plurality of pixels, for instance a pixel line or column, or an entire image frame. For instance, in a first embodiment, one pixel is moved randomly or according to a given pattern with respect to the others. A displacement of substantially ½ to 1/100 of the pixel size, advantageously around 1/10 of the pixel size, provides positive results. In a variant, complete lines or columns of pixels are displaced relative to other lines or columns.

In another embodiment, a complete image frame is displaced or moved relative to other frames, either randomly or according to a defined way.

The pixels or frames displacements enable to average the light emissions. For an observer eye placed in a way to look at the projection image, the processed light provides an anti-speckle effect such that perceived speckle is reduced or suppressed. A similar effect is also provided for a sensor placed to receive the generated illumination.

Figure 2:
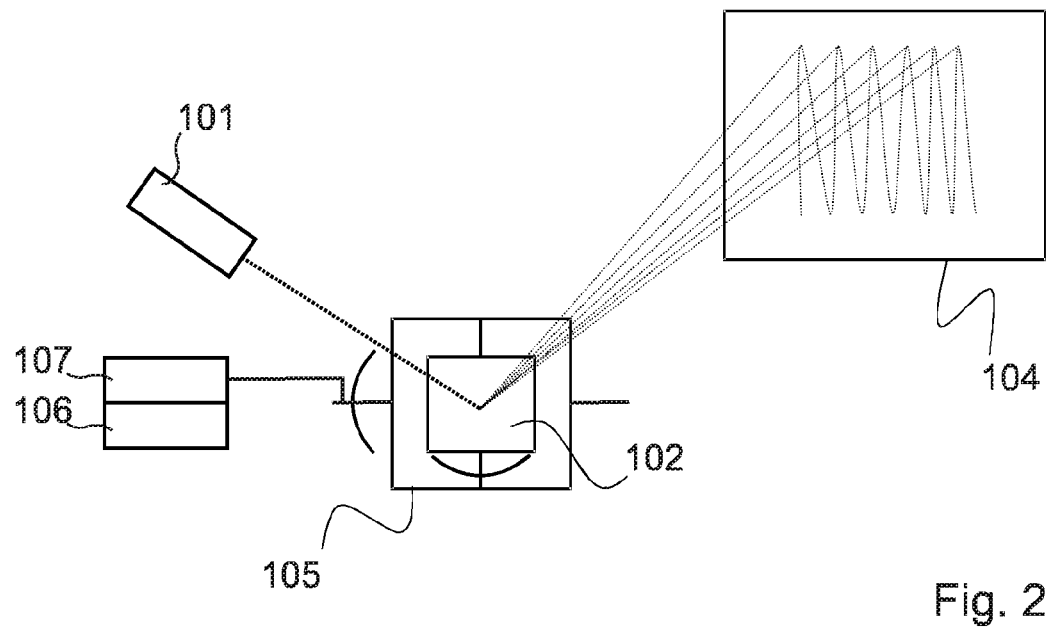
FIG. 2 illustrates an example of a micro-projection system with a scanning mirror drive unit and a pixel displacement unit providing together a driving signal with a superposed micro-vibration signal.

FIG. 2 illustrates an embodiment in which the micro-projection system is provided with a scanning mirror drive unit 107 and a pixel displacement unit 106 providing together a driving signal with a superposed pixel displacement signal. Thus, in this first embodiment of the invention, the micro-mirror 102 is used as an anti-speckle mirror. The single 2DOF micro-mirror is connected to the pixel displacement unit 106, providing a signal superposed to the reflective member drive signal. The displacement signal provided by the pixel displacement unit 106 is most preferably synchronized with the image scanning signal provided by the scanning mirror drive unit 107.

Figure 3:
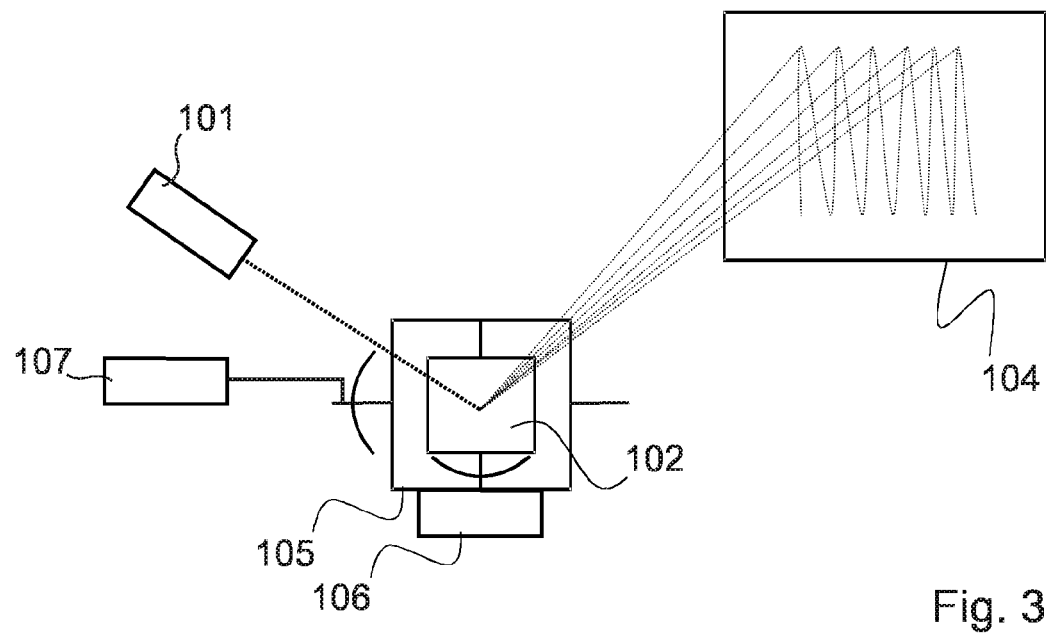
FIG. 3 illustrates another example of a micro-projection system with a pixel displacement unit acting directly on a scanning mirror.

FIG. 3 illustrates an embodiment of a micro-projection system in which a pixel displacement unit 106 acts by direct contact with a scanning mirror 102. In this embodiment, the pixel displacement unit 106 comprises either a magnetic, or thermal, or piezo-electric, or electrostatic generation unit to provide the required displacement. In a variant, the pixel displacement unit 106 comprises a MEMS mirror heating and cooling system. The pixel displacement unit is preferably placed in direct contact with the scanning mirror to allow the produced micro-vibrations to be transmitted to the micro-mirror. For proper operation of the micro-projection system, the displacement signal provided by the pixel displacement unit 106 is most preferably synchronized with the image-scanning signal provided by the scanning mirror drive unit 107.

Figure 4:
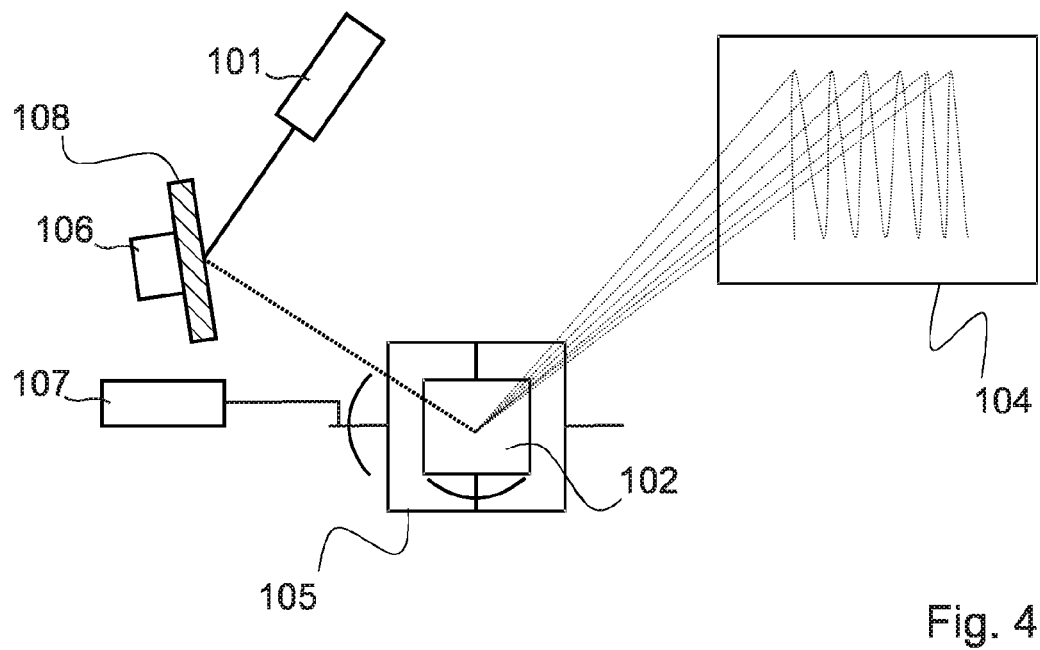
FIG. 4 illustrates a further example of a micro-projection system provided with an additional mirror or membrane connected to pixel displacement unit.

FIG. 4 illustrates a variant of the previous a micro-projection system provided with an additional mirror or membrane 108 connected to a pixel displacement unit 106. As previously described for the embodiment of FIG. 3, the pixel displacement unit 106 comprises either a magnetic, or thermal, or piezo-electric, or electrostatic generation unit to provide the required displacement. In a variant, the generator 106 may comprise a rotating micro-motor having a substantially rough surface, thereby providing the required displacement.

Figure 5:
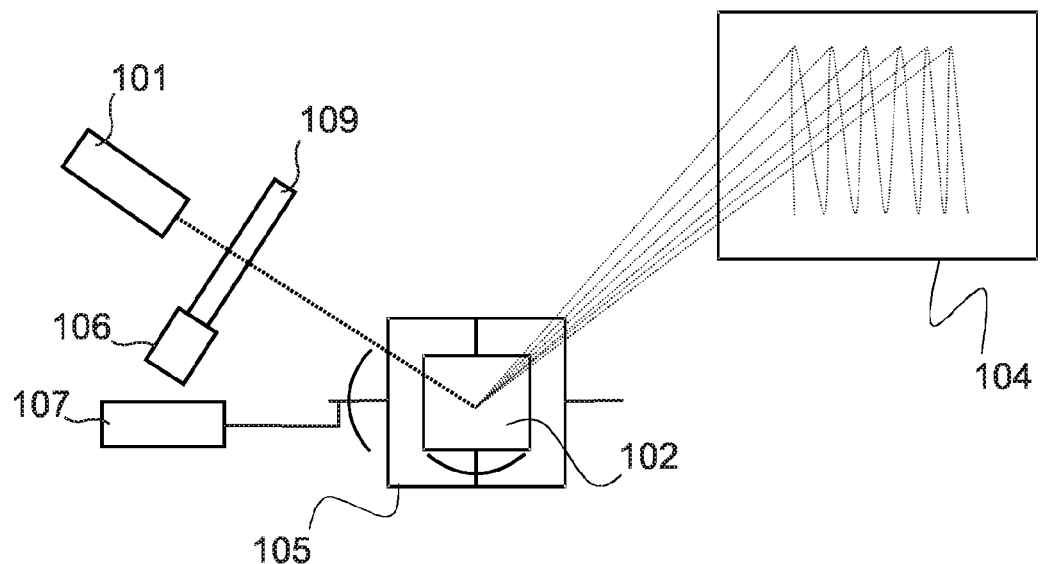
FIG. 5 illustrates a still further example of a micro-projection system provided with an additional transparent optical element, connected to a pixel displacement unit.

FIG. 5 illustrates a still further example of a micro-projection system provided with an additional transparent optical element 109, connected to a pixel displacement unit 106. The unit 106 is preferably placed in direct contact with the scanning mirror to allow the produced micro-vibrations to be transmitted to the optical element. As previously described for the embodiment of FIG. 3, a magnetic, or thermal, or piezo-electric, or electrostatic generation unit to provide the required displacement. For proper operation of the micro-projection system, the displacement signal provided by the pixel displacement unit 106 is most preferably synchronized with the image-scanning signal provided by the scanning mirror drive unit 107.

Figure 6:
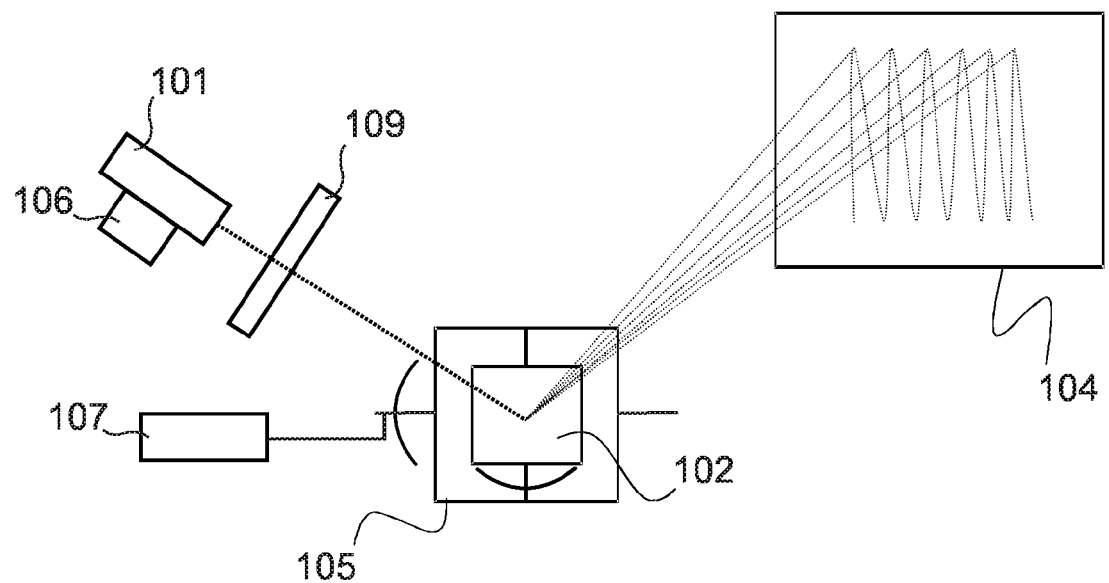
FIG. 6 illustrates yet another example of a micro-projection system in which the light source or sources is/are provided with a pixel displacement unit.

FIG. 6 illustrates yet another example of a micro-projection system in which the light source or sources is/are provided with a pixel displacement unit 106, also provided with a magnetic, or thermal, or piezo-electric, or electrostatic generation unit to provide the required displacement, as previously described.

All previous embodiments may also be implemented in a micro-projection system comprising two 1DOF micro-mirrors (as shown in FIG. 1B).

Monochromatic scanning and projection can be achieved with the previous described architectures using a single laser source. For color projection with multiple laser sources, similar assembly concepts can be applied by specifically shaping a known beam combiner optical module. The beam combiner may be composed of multiple optical components with specific coatings allowing to reflect certain wavelength and to transmit certain other wavelengths. An example of architecture for color projection is using three light sources, typically red, green and blue to achieve the visible spectrum range. However this architecture is not limited to three light sources and to the visible spectrum, but can be expanded to multiple light sources and to the other part of the spectrum, which can help to achieve a wider spectral range.

The shape of the MEMS scanning micro-mirror is not limited to the geometry presented in the Figures but can also have a circular or an elliptical shape. The described architectures can be either applied for fully or partially encapsulated MEMS scanning micro-mirror based on electrostatic, electromagnetic, thermal and piezoelectric actuation principles.

FIG. 7a illustrates the main step of the method for reducing speckle in a laser micro-projection system in accordance with the invention. At step 200, a plurality of image frames are projected towards a given target or projection surface. At step 201, pixels or frames are displaced in relation with each other.

Figure 8A:
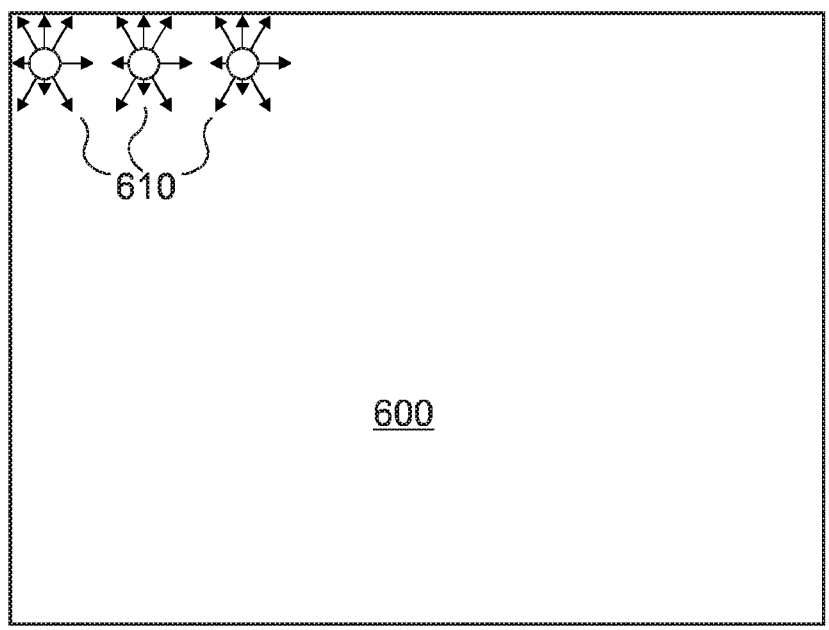
FIGS. 8A and 8B illustrate image frames with displacements of pixels (FIG. 8A) or frames (FIG. 8B).

FIG. 7b presents a first embodiment of the method involving pixel displacements within a single frame, as shown in FIG. 8a. Pixels may be displaced either on a random or organized way. The displacements may involve pixels selected within the frame, or complete lines of pixels or complete columns of pixels.

Figure 8B:
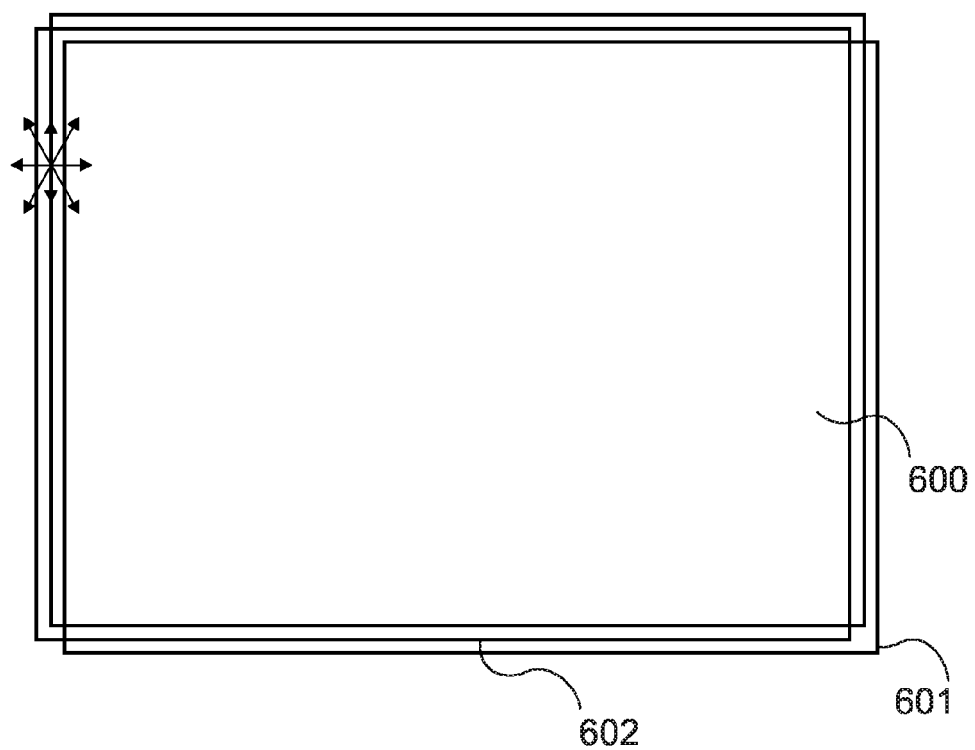

FIG. 7c presents a second embodiment involving displacements of entire image frames. Successive frames 600, 601, 602 are moved with respect to the others, as shown in FIG. 8b.

Pixel displacements may be generated according to several different approaches. First, a pixel displacement unit 106 is coupled to the scanning mirror drive unit 107, which sends a drive signal to the scanning mirror 102 with superposed and synchronized displacement signal. In a second approach, the pixel displacement unit 106 is mechanically connected to an optical element, such as a scanning-mirror, as shown in FIG. 3, to an anti-speckle mirror or membrane 108, as shown in FIG. 4, to an anti-speckle optical element 109, as shown in FIG. 5, or to the light source 101, as shown in FIG. 6. The pixels or frames displacements provide an anti-speckle effect.

In a further approach, pixel displacement is achieved by pulsing the laser at unevenly spaced instants in time, i.e., with a variable phase. If the laser pulse is sent in advance or too late with regard to a normal situation, the deflection made by the mirror would be different, resulting in a displaced pixel, for example an horizontally displaced pixel.

Several different approaches for displacing pixels can also be combined and used simultaneously.

The invention claimed is:

1. A micro-projection system for projecting light on a projection surface, comprising:
   at least one coherent light source;
   optical elements in the optical path between said coherent light source and said projection surface;
   said optical elements including at least one reflective member actuated by a drive signal for deviating light from said light source so as to scan a projected image onto said projection surface;
   said system including at least one pixel displacement unit for displacing the position of the pixel with respect to the position of a corresponding pixel in another image frame, so as to reduce speckle onto said projection surface, wherein said pixel displacement unit is arranged for controlling the coherent light source so as to modify the phase of laser pulses sent by said at least one coherent light source, so that the position of said pulses on said projection surface is modified by said phase modification.

2. A micro-projection system according to claim 1, wherein said pixel displacement unit is arranged for providing a displacement signal synchronized with the image scanning signal so as to reduce speckle onto said projection surface.

3. A micro-projection system according to claim 1, wherein said pixel displacement unit is adapted to provide a displacement of at least a portion of a first image frame with respect to other image frames in order to reduce speckle.

4. A micro-projection system according to claim 1, wherein said reflective member is a MEMS type scanning mirror and said pixel displacement unit is further connected to said scanning mirror.

5. A micro-projection system according to claim 1, wherein said pixel displacement unit is further connected to an additional optical element provided in the optical path and the pixel displacement unit further provides displacement of the additional optical element.

6. A micro-projection system according to claim 5, wherein said additional element is a mirror being adapted to provide said displacement.

7. A micro-projection system according to claim 5, wherein said additional element is a reflective membrane.

8. A micro-projection system according to claim 4, wherein said pixel displacement unit further comprises a magnetic, thermal, piezo-electric, or electrostatic generation unit.

9. A micro-projection system according to claim 4, wherein said pixel displacement unit further comprises a rotating micro-mirror having a rough surface.

10. A micro-projection system according to claim 4, wherein said pixel displacement unit is a thermally actuated displacement unit which further comprises a MEMS mirror heating and cooling system.

11. A method for reducing speckle in a laser micro-projection system, comprising:
    providing a plurality of successive image frames with at least one coherent light source towards a target;
    providing a displacement of at least a portion of a first image frame with respect to the same or another image frame so as to reduce speckle onto said projection surface, by controlling light source so as to modify the phase of laser pulses sent by said at least one coherent light source.

12. A method for reducing speckle in a laser micro-projection system according to claim 11, wherein, in a single frame, a plurality of pixels are moved with respect to the others.

13. A method for reducing speckle in a laser micro-projection system according to claim 11, wherein, in a plurality of successive frames, at least one frame is moved with respect to other frames.

14. A method for reducing speckle in a laser micro-projection system according to claim 11, wherein pixel displacement is at least 10% of the pixel size.

15. A method for reducing speckle in a laser micro-projection system according to claim 11, wherein pixel displacement is provided by modifying the temporal position of corresponding laser pulses between successive frames.

* * * * *